(12) United States Patent
Yamauchi

(10) Patent No.: US 6,392,377 B1
(45) Date of Patent: May 21, 2002

(54) MOTOR CONTROL APPARATUS AND MOTOR CONTROL METHOD

(75) Inventor: Tsuyoshi Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/271,693

(22) Filed: Mar. 18, 1999

(51) Int. Cl.$^7$ ............................................. G05B 11/01
(52) U.S. Cl. ..................... 318/630; 318/280; 318/282; 318/283; 318/285; 318/432; 318/443; 318/631
(58) Field of Search ................................. 318/280, 282, 318/283, 285, 630, 631, 432, 443

(56) References Cited

U.S. PATENT DOCUMENTS

| | | | | |
|---|---|---|---|---|
| 3,828,238 A | * | 8/1974 | Kobayashi et al. | 318/630 |
| 4,605,884 A | * | 8/1986 | Miyagi | 318/314 |
| 5,008,605 A | * | 4/1991 | Ohara et al. | 318/630 |
| 5,283,662 A | * | 2/1994 | Nakajima | 358/409 |
| 5,471,536 A | * | 11/1995 | Kurokawa | 382/315 |
| 5,475,787 A | * | 12/1995 | Kato | 388/811 |
| 5,586,499 A | * | 12/1996 | Baeumont et al. | 101/211 |
| 5,596,427 A | * | 1/1997 | Homma et al. | 358/515 |
| 5,672,945 A | * | 9/1997 | Krause | 318/434 |
| 5,808,431 A | * | 9/1998 | Koyama et al. | 318/278 |
| 5,821,720 A | * | 10/1998 | Deng et al. | 318/630 |
| 5,821,977 A | * | 10/1998 | Nishimura | 347/234 |

* cited by examiner

Primary Examiner—Bentsu Ro
Assistant Examiner—Tyrone Smith
(74) Attorney, Agent, or Firm—Robin, Blecker & Daley

(57) ABSTRACT

A motor control apparatus is arranged to drive and control a motor for transmitting the rotating force of the motor through a gear train. In reversing the rotation of the motor, the motor is caused to rotate at a speed higher than a normal rotation speed for a period of time which is about the same as a period of time required for absorbing a clearance or play existing between the gears. In this instance, since the motor is under no load, the motor is rotated at the higher speed with a small current and a small torque. The arrangement effectively lessens a noise generated in reversing the rotation of the motor due to the clearance or play existing in the motor driving force transmitting part.

24 Claims, 10 Drawing Sheets

STOPPING POSITION

DIRECTION OF READING →

TEMPORARY STOP

DIRECTION OF REVERSE READING ←

STOPPING POSITION

MOTOR CONTROL APPARATUS AND MOTOR CONTROL METHOD

BACKGROUND OF THE INVENTION

1. Field of the Invention

The present invention relates to a control technique for driving a motor used particularly for an image scanner or the like.

2. Description of Related Art

Business machines, such as an image scanner, a copying machine, an XY plotter, a printer, a facsimile machine, etc., are often arranged to switch the rotating direction of a motor between normal and reverse rotations for carrying out various work with reciprocating motions.

As one example of such a normal-and-reverse rotation conversible arrangement for the motor, an image scanner is arranged as shown in FIG. 9. Referring to FIG. 9, the image scanner 106 is arranged to scan and read information provided on an original P, by moving, with a motor (not shown), a light source 101 such as a xenon lamp or the like to the right, as viewed FIG. 9, in such a way as to serially illuminate the original P, which is placed on an original placing glass plate 100. Then, image light reflected from the original P is led through mirrors 102, 103 and 104 to an image sensor 105 which is composed of a CCD, etc. The image sensor 105 converts the image light into an electrical signal. The motor is then reversely driven to move the light source 101 to the left, as viewed in FIG. 9, so as to make preparation for scanning information provided on the next original.

In a case where the image scanner 106 is used as an image input device for a host computer, if a reading action is interrupted or discontinued while reading one page of an original is still in process, the motor is driven reversibly (backward) even if the motor is in process of normal (forward) rotation.

With the image scanner 106 used as an image input device for a host computer, the host computer first temporarily stores image data sent from the image scanner 106 in a buffer memory and then processes the image by gradually taking out the image data from inside of the buffer memory. In this instance, if the buffer memory is filled up with the image data while the image processing action is still in process, an overflow of the incoming data is prevented by sending a data-output-stop signal from the host computer to the image scanner 106 and the reading action is put to a pause. After that, the image scanner 106 is requested to restart sending the image data when the fear of overflow disappears.

At the time of restart of transmission of image data from the image scanner 106, if the reading action is allowed to be restarted from a position where the reading action has been put to the pause, an image obtained by reading tends to be affected by the vibrations of the optical system remaining in the image. To prevent such image deterioration, the image scanner 106 causes the motor to reversibly rotate to move the light source 101 backward to an extent of a predetermined distance of an approach run. Then, the motor is allowed to rotate again to gradually increase its rotation speed up to a rotation speed corresponding to a prescribed scanning (reading) speed. When the light source 101 reaches its interrupted position, the reading action is allowed to be resumed.

The driving force of the motor is transmitted through a transmission means such as gears, etc., to an optical system arranged for the light source 101, etc. However, in a case where the motor is caused to reversely rotate as mentioned above, backlash between teeth of an intermeshing pair of gears is arranged to be absorbed in the initial stage of reverse rotation driving.

However, since the rotation speed of the motor is gradually increased even while the backlash or the like is being absorbed, as shown in FIG. 10, a noise due to chattering of gears or face deflection vibrations has been generated over a long period of time. Particularly, in the case of reading many originals with the image scanner, frequent reverse rotation of the motor frequently brings about such a noise. Therefore, effective measures against the generation of the noise have been strongly desired.

BRIEF SUMMARY OF THE INVENTION

It is a principal object of the invention to lessen the noise taking place when a motor is reversely rotated due to a clearance in a transmission part which is arranged to transmit the driving force of the motor.

To attain the above object, in accordance with an aspect of the invention, there is provided a motor control apparatus for driving and controlling a motor so as to transmit a rotating force of the motor through a plurality of transmission means, the motor control apparatus comprising control means for, when reversing a rotation of the motor, causing the motor to rotate at a speed higher than a normal rotation speed only for a period of time which is substantially the same as a period of time required for absorbing a clearance existing between the plurality of transmission means.

Such an arrangement of the motor control apparatus effectively lessens the noise generated in reversing the rotation of the motor due to a clearance in the motor driving force transmitting part.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

(First Embodiment)

Figure 1A:
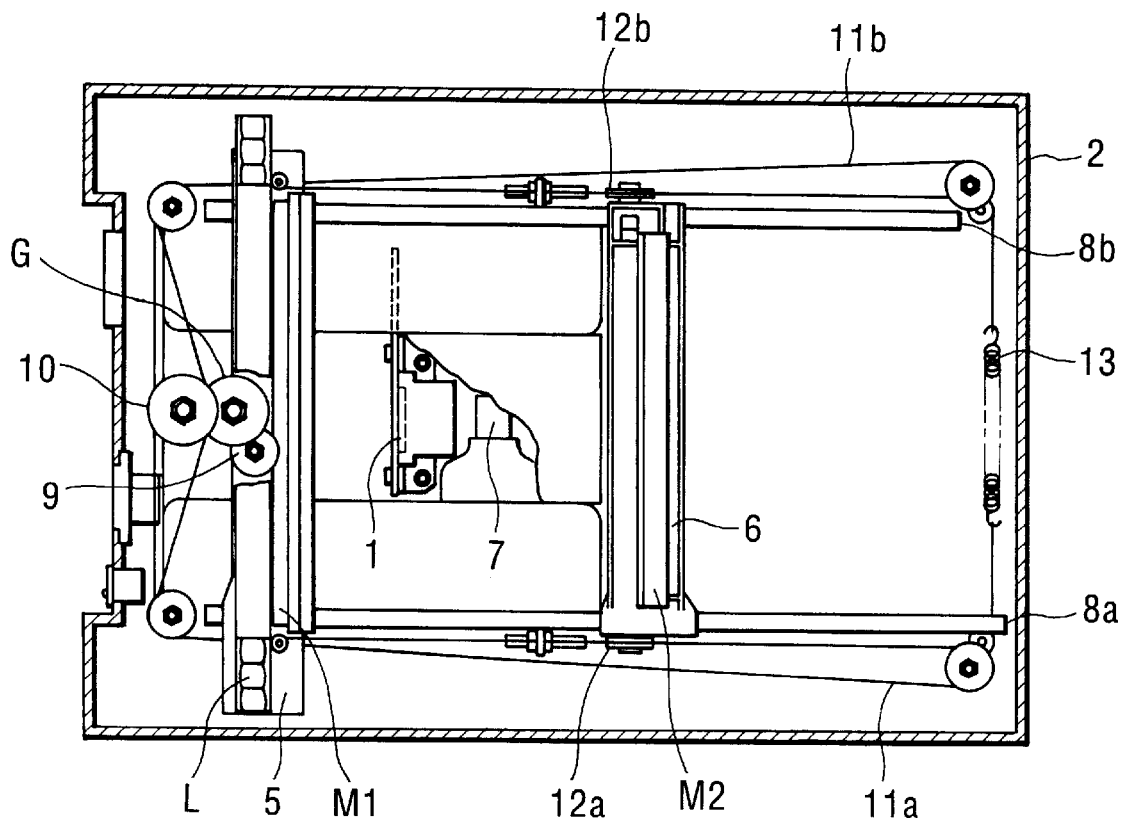
FIGS. 1(a) and 1(b) schematically show the structural arrangement of an image scanner as a motor control apparatus according to a first embodiment of the invention.
Figure 1B:
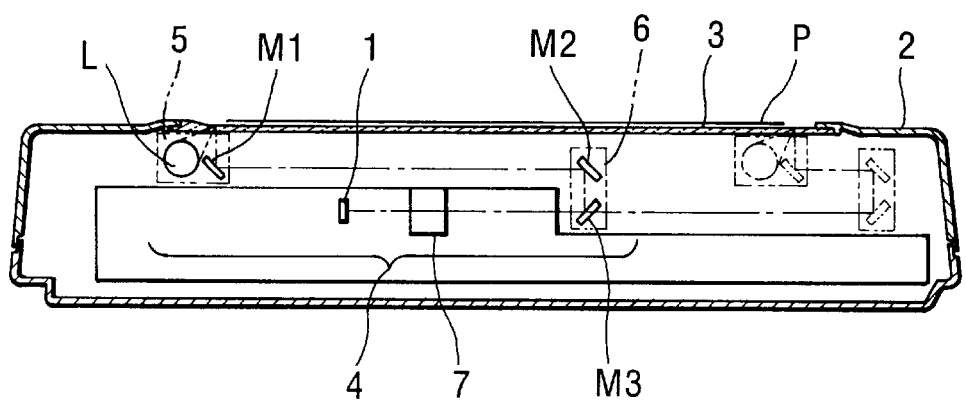

FIGS. 1(a) and 1(b) are vertical and transverse sectional views, respectively, showing in outline the arrangement of an image scanner as a motor control apparatus according to a first embodiment of the invention.

Referring to FIGS. 1(a) and 1(b), an image sensor 1 which is a CCD or the like is disposed inside of the body 2 of the apparatus. An original placing glass plate 3 is disposed on the upper surface of the apparatus body 2. A photo-scanning part (scanning optical system) 4 is arranged to perform a photo-scanning action on an original P placed on the original placing glass plate 3 to obtain image light of the original P. The image light is then made to be incident on the image sensor 1.

The photo-scanning part 4 includes a lamp unit 5 which is arranged to be driven through wires, a mirror unit 6, and a lens 7. The lamp unit 5 is composed of an illumination lamp L which is arranged to illuminate the original P, and a first mirror M1 which is arranged to reflect reflection light from the original P toward the mirror unit 6. The mirror unit 6 is composed of second and third mirrors M2 and M3 which are arranged to bend the image light reflected by the first mirror M1 toward the image sensor 1.

The lamp unit 5 and the mirror unit 6 are supported by a pair of rails 8a and 8b in such a way as to permit scanning in parallel with an optical axis of the lens 7 while being kept perpendicular to the optical axis. A pulse motor (stepping motor) 9 is arranged as a drive source for the scanning with the lamp unit 5 and the mirror unit 6. The rotating force of the pulse motor 9 is arranged to be transmitted to a driving drum 10 via a gear train G.

The driving drum 10 has two wires 11a and 11b interconnected at one part and wound around the driving drum 10. First ends of the wires 11a and 11b are secured to the body 2 of the apparatus with their intermediate parts secured to the lamp unit 5 and wrapped halfway around the peripheries of pulleys 12a and 12b disposed at two ends of the mirror unit 6. The other ends of the wires 11a and 11b are interconnected through a tension spring 13 after wrapping halfway around the pulleys 12a and 12b. Therefore, by the principle of a running block, the operating speed of the mirror unit 6 becomes ½ of that of the lamp unit 5, so that the optical path length of the apparatus can be kept constant over the whole scanning area thereof.

Figure 2:
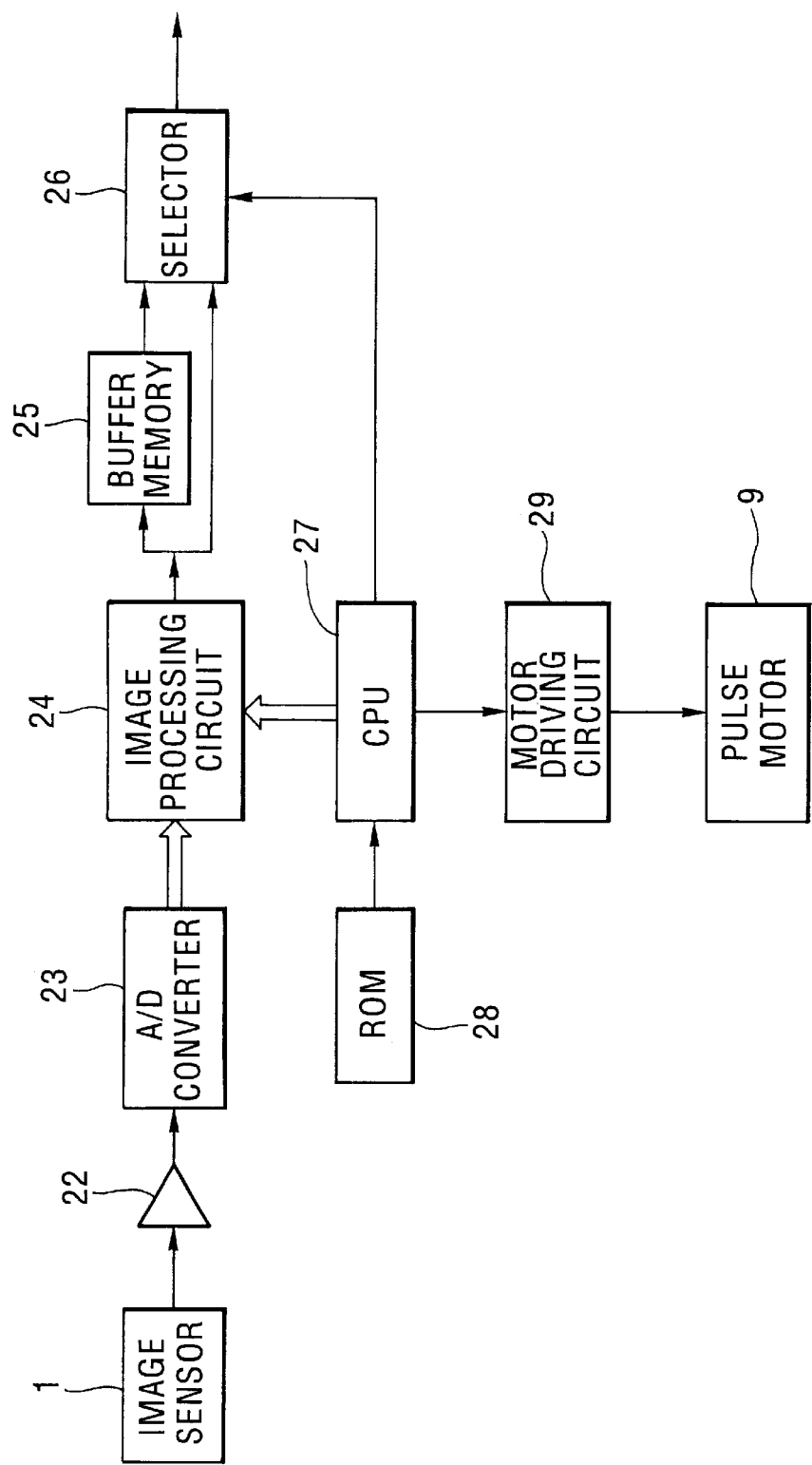
FIG. 2 is a block diagram showing in outline the arrangement of a control part of the image scanner shown in FIGS. 1(a) and 1(b).

The arrangement of a control system of the image scanner is next described with reference to FIG. 2. To use the image scanner as an input device for a host computer, the image scanner is connected to the host computer by means of an SCSI (small computer system interface) or the like.

The image sensor 1 photoelectrically converts image light inputted from the photo-scanning part 4 into an analog image signal and outputs the analog image signal to an amplifier 22. The amplifier 22 amplifies the image signal. The amplified image signal is sent to an A/D converter 23 to be converted into a digital image signal. The digital image signal is sent to an image processing circuit 24. In accordance with an instruction from a CPU 27, the image processing circuit 24 processes the digital image signal to output R (red), G (green) and B (blue) image signals.

More specifically, the CPU 27 supplies the image processing circuit 24 with shading correcting data, etc., by using image processing parameters designated by the host computer. The CPU 27 also controls and causes a motor driving circuit 29 to send a driving signal to the pulse motor 9. Driving control over the pulse motor 9 will be described in detail later herein. The R, G and B image signals precessed by the image processing circuit 24 are outputted through two routes. By one route, the image signals are sent to a selector 26 through a buffer memory 25. By the other route, the image signals are sent directly to the selector 26.

The selector 26 performs switching from one route over to the other under the control of the CPU 27, as will be described in detail later. A ROM 28 is arranged to prestore therein a motor driving control program in addition to some programs for control over the image processing circuit 24 and the selector 26.

The details of the motor driving control which is peculiar to the first embodiment are described as follows.

The lamp unit 5 and the mirror unit 6 are normally placed at their home positions, which are set in the neighborhood of a start position for reading the original P. When a reading start signal is sent from the host computer in this state, the CPU 27 sends a signal to the motor driving circuit 29. In accordance with the signal from the CPU 27, the motor driving circuit 29 supplies to the pulse motor 9 motor driving pulses which are synchronized with a driving signal for the photo-scanning part 4. The lamp unit 5 and the mirror unit 6 are moved by the rotation of the pulse motor 9 for photo-scanning, so that the image on the original P begins to be read. Then, upon receipt of a request for an image data output from the host computer, image data thus obtained is transmitted to the host computer.

Figure 3:
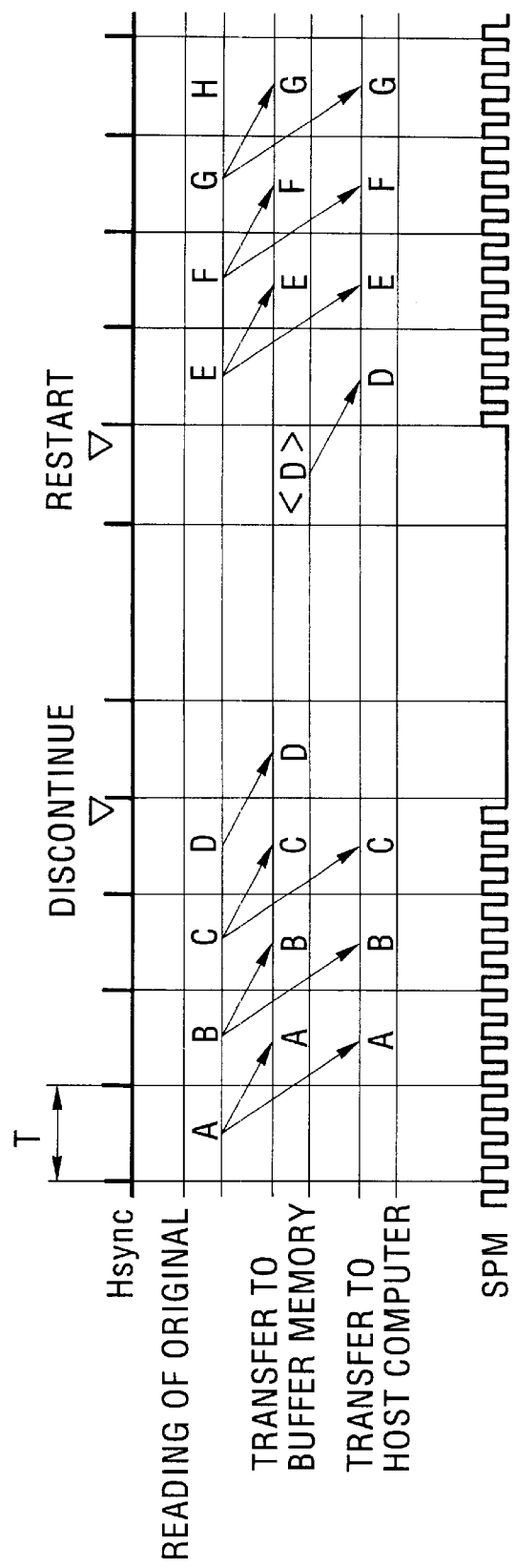
FIG. 3 is a time chart showing the timing of transfer of data obtained by reading.

Generally, an image sensor which is a CCD or the like is arranged to operate under a clock signal which is outputted cyclically at intervals of a predetermined period. In the case of the first embodiment, the image sensor 1 requires a two-period amount of clock pulses in processing one line of image data. As shown in FIG. 3 which is a time chart showing the timing of transfer of image data, the image is read in the first period and is transferred in the next period. In FIG. 3, reference symbol Hsync denotes a reading synchronizing signal which is outputted at intervals of an electric charge accumulating time T (msec) of the image sensor. Reference symbol SPM denotes the pulse motor driving signal which is outputted in synchronism with the reading synchronizing signal Hsync. In the case of the first embodiment, the lamp unit 5 is arranged to be moved to an extent corresponding to one line of image data with four pulses applied to the pulse motor 9.

Normally, the CPU 27 controls the selector 26 to cause the R, G and B image signals from the image processing circuit 24 to be directly outputted. The R, G and B image signals are transferred to the host computer during the next period after the period of reading. However, if a buffer memory which is incorporated in the host computer to store the R, G and B image signals is filled up with the image signals, the host computer prevents an overflow of data by sending a busy signal to the image scanner to cause the image scanner to stop the data transfer. On the side of the image scanner, upon receipt of the busy signal, the CPU 27 switches the use of the selector 26 over to the buffer memory 25 to store data of the current reading line into the buffer memory 25, and puts the reading action to a pause.

When the host computer is relieved from the busy state and again sends a data output requesting signal, the image scanner resumes and restarts its reading action. In this instance, the CPU 27 first causes data read before the pause to be sent from the buffer memory 25 to the host computer. After that, the normal data transfer route is retaken by switching the connecting position of the selector 26 back to the image processing circuit 24.

In resuming the reading action, if the reading action is restarted by moving the optical system from its position at which the reading action has been suspended, a trace of shaking of the optical system which takes place at the time of restart would remain in the read image to deteriorate the quality of the image. To avoid such image deterioration, the pulse motor 9 is reversely rotated as much as a predetermined distance of approach run to temporarily move the optical system back in the direction opposite to the reading direction. The distance of approach run means a distance necessary for avoiding the deterioration of read image due to the shaking of the optical system which tends to take place before the driving speed of the driving system reaches a predetermined reading speed. After that, the rotating direction of the pulse motor 9 is reversed again to move the optical system in the reading direction, and the reading action is allowed to be resumed from the reading-action-suspended position.

Figure 4:
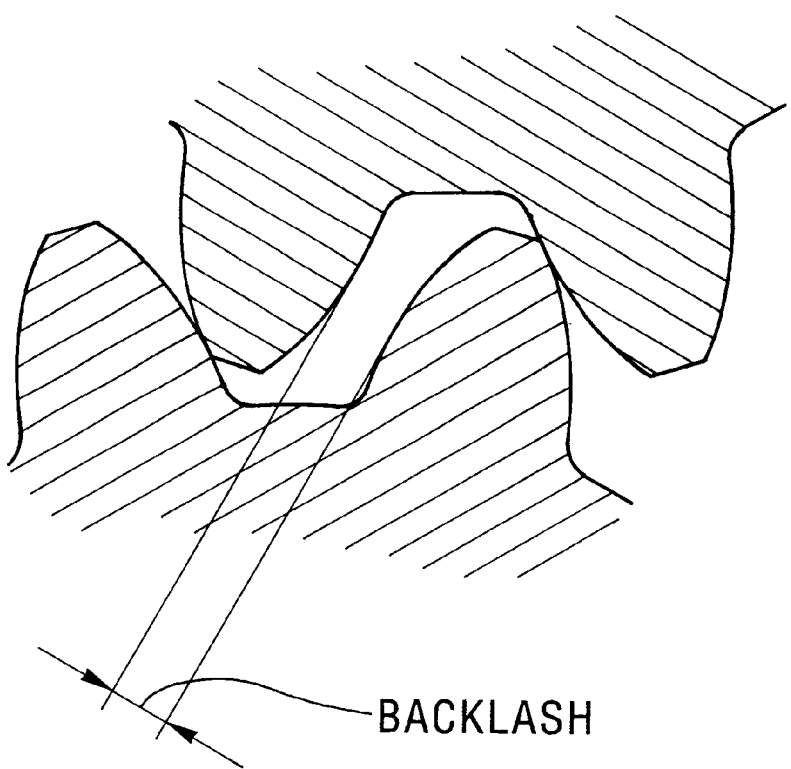
FIG. 4 is a diagram showing a backlash between gears.

Between the gear subraces of intermeshing teeth of gears of the gear train G, there is a backlash clearance as shown in FIG. 4. In the initial stage of reversing the rotation of the motor, the gear train G acts in such a way as to absorb the backlash. The backlash absorbing action of the gear train G generates a noise due to chattering and face deflection.

Figure 10:
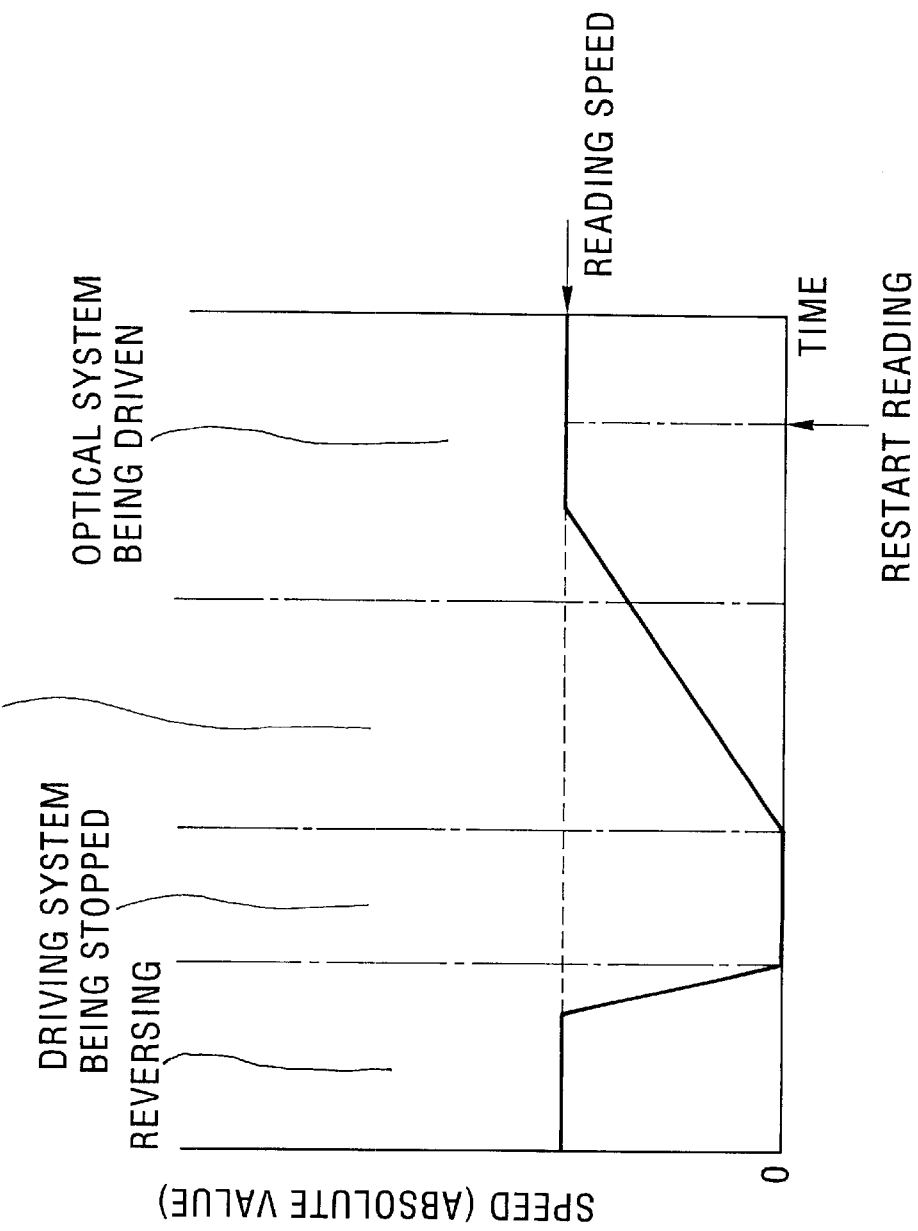
FIG. 10 is a time chart showing control over the reverse rotation of a motor performed by the conventional image scanner.

In a case where the motor rotating speed is gradually increased, as in the case of the conventional arrangement shown in FIG. 10, this noise becomes too salient as it continues over a long period of time. In view of that, the first embodiment of the invention is arranged to lessen the noise of the gear train G by causing the pulse motor 9 to rotate at a high speed just for a period of time which is a little shorter than the backlash absorbing time. In other words, the length of time of noise generation by the gear train G is shortened by utilizing the backlash absorbing time during which the optical system is not moved as yet.

Figure 5:
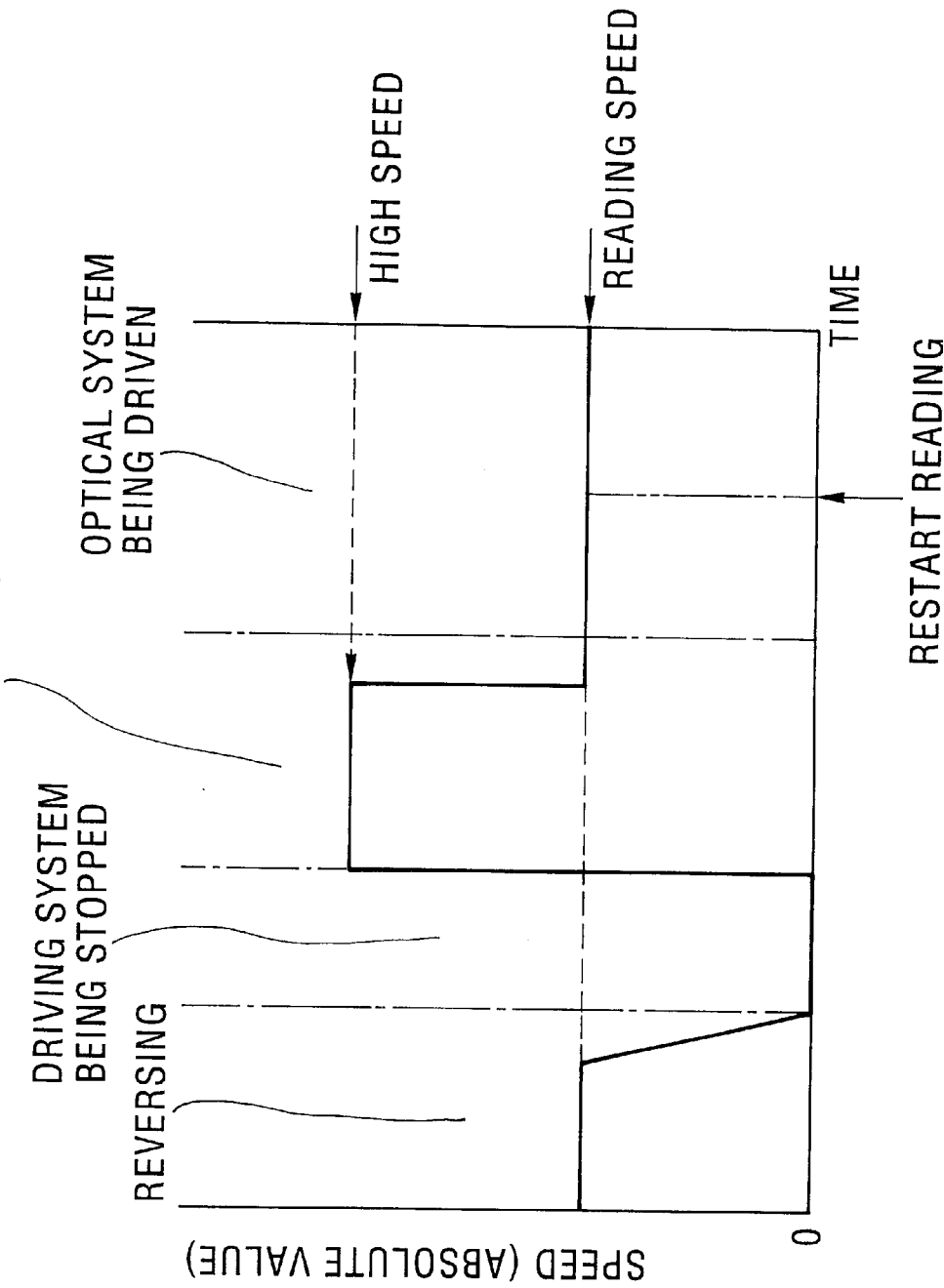
FIG. 5 is a time chart showing control over the reverse rotation of a motor in the first embodiment of the invention.

At that time, as shown in FIG. 5, the pulse motor 9 is caused to rotate at the high speed not throughout the whole backlash absorbing time. The rotating speed of the motor is lowered to the normal reading speed in the stage where the amount of backlash has become small, thereby lessening a noise brought about by the mutual collision of the gears, so that the noise can be more effectively lessened. Further, since there is almost no driving load while there exists the backlash, the noise is further lessened also by rotating the pulse motor 9 with a small amount of current in such a way as to reduce the motor torque.

In addition, while FIG. 5 shows only the control for moving the optical system in the reading direction again in a case where the optical system is to be moved in the rereading direction after the image scanner is put to a pause and moved back in the direction opposite to the reading direction. However, the first embodiment is arranged to cause the pulse motor 9 to rotate likewise at the high speed for a period of time a little shorter than the backlash absorbing time also at the commencement of moving the optical system back to its home position in reversely rotating the motor after a pause or at the commencement of a normal original reading action or after the end of reading.

In the case of FIG. 5, after the optical system is driven at a high speed by rotating the pulse motor 9 at the high speed, the rotating speed of the pulse motor 9 is brought back to the normal reading speed. However, the arrangement may be changed to drive the optical system at a speed slower than the normal reading speed after the high speed driving and, after that, to increase the slow driving speed gradually up to the reading speed. In other words, the lower motor rotating speed after reduction of noise by the high speed rotation of the pulse motor 9 can be set as desired.

(Second Embodiment)

Figure 6:
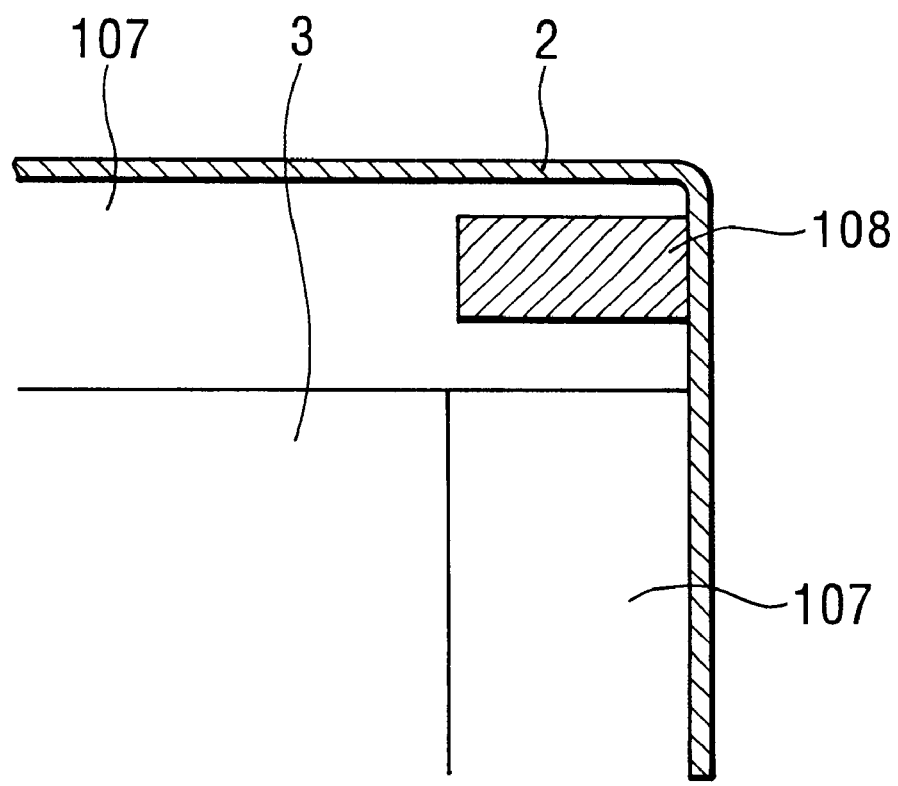
FIG. 6 is a diagram showing backlash-amount measuring means according to a second embodiment of the invention.
Figure 7A:
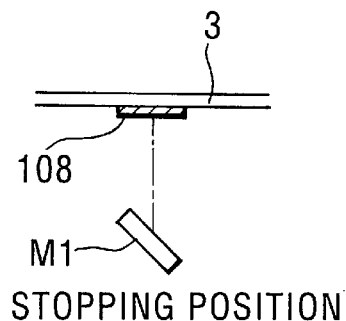
FIGS. 7(a) to 7(e) show the measuring method by the backlash-amount measuring means in the second embodiment of the invention.
Figure 7B:
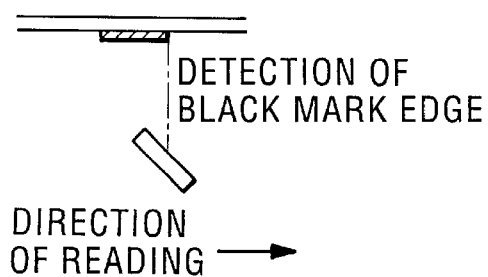
Figure 7C:
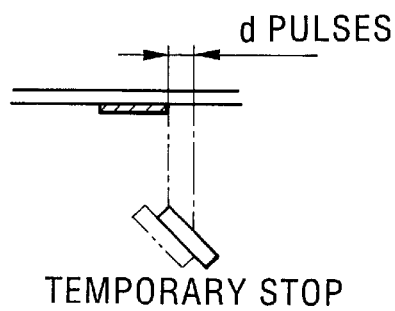
Figure 7D:
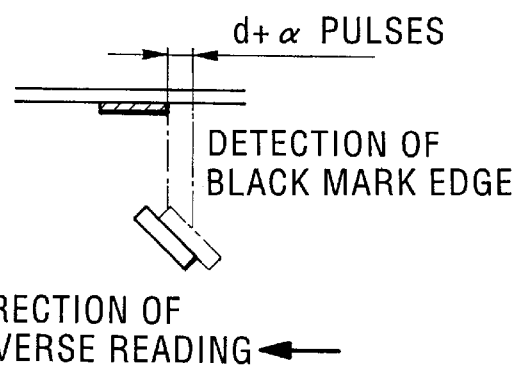
Figure 7E:
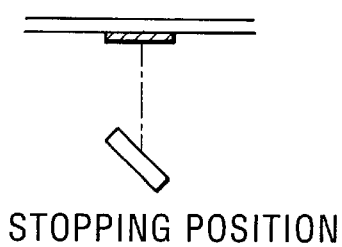

A second embodiment of the invention is next described referring to FIG. 6 and FIGS. 7(*a*) to 7(*e*). The second embodiment is arranged to measure the amount of backlash and to determine the length of time of high speed rotation of the pulse motor 9 on the basis of the amount of backlash measured.

An index 107 is stuck to the original placing glass plate 3 on which the original is to be placed. As shown in FIG. 6, a black mark 108 provided for detecting a home position is printed on the reverse side (inner side) of the index 107. The amount of backlash is measured by using the block mark 108, as follows.

As shown in FIG. 7(*a*), the optical system which includes the first mirror M1 has the first mirror M1 in repose at a position opposed to the central part of the black mark 108 indicative of the home position. Then, as shown in FIG. 7(*b*), the edge of the black mark 108 is detected by moving the optical system in the reading direction. When the optical system is moved as much as a predetermined number "d" of pulses from the black-mark edge detecting position, the movement of the optical system is brought to a temporary stop, as shown in FIG. 7(*c*). The optical system is next moved in the direction opposite to the reading direction so as to detect again the edge of the black mark 108, as shown in FIG. 7(*d*), and the number "d+α" of pulses required for the detection of the edge of the black mark 108 is measured. After that, the optical system is returned to the home position, as shown in FIG. 7(*e*).

In moving the optical system in the direction opposite to the reading direction, as shown in FIG. 7(*d*), the pulse motor 9 is reversely rotated. In the initial stage of the reverse rotation, the gear train G acts in such a way as to absorb the backlash taking place in the gear train G. Hence, a difference "α" between the number "d" of pulses shown in FIG. 7(*c*) and the number of pulses "d+α" shown in FIG. 7(*d*) corresponds to the amount of backlash. Accordingly, the CPU 27 finds the value of the difference "α" and sets it as the amount of backlash. Then, in the initial stage of reversely rotating the pulse motor 9, the motor driving circuit 29 is controlled to rotate the pulse motor 9 at a high speed by outputting, in a short cycle, a number of pulses corresponding to the pulse number difference "α".

According to the above-stated arrangement of the second embodiment, the amount of backlash can be set for each individual apparatus. This obviates the necessity of taking into consideration unevenness in the amount of backlash between one apparatus and another. Therefore, the noise can be more effectively lessened than in the case of the first embodiment.

(Third Embodiment)

Figure 8:
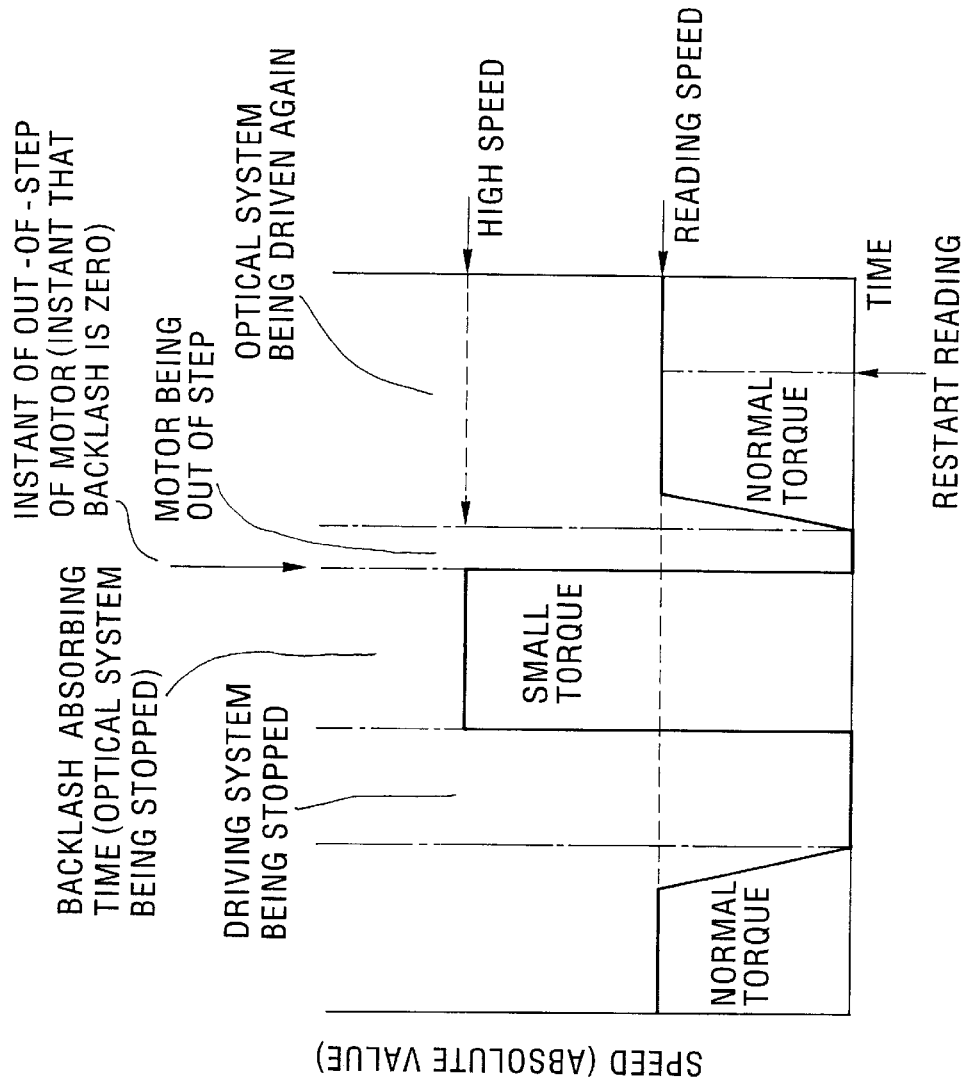
FIG. 8 is a time chart showing control over the reverse rotation of a motor according to a third embodiment of the invention.
Figure 9:
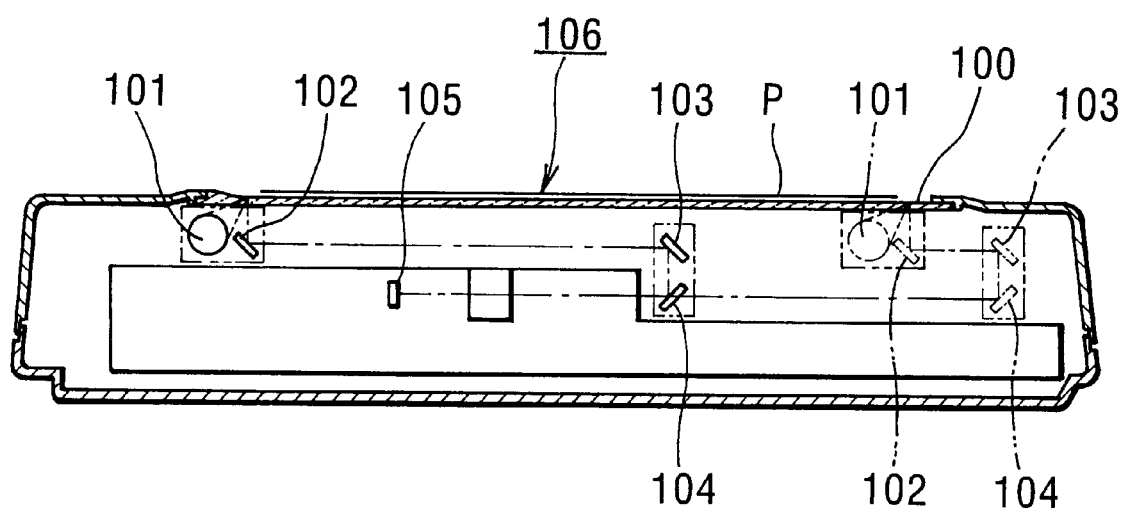
FIG. 9 schematically shows the conventional arrangement of an image scanner.

A third embodiment of the invention is next described referring to FIG. 8. The stepping (pulse) motor has such a characteristic that, when the motor is driven with a small current or is driven to rotate at a high speed, the pull-out torque of the motor lowers to let the motor readily come out of step. The third embodiment of the invention takes advantage of that characteristic of the stepping (pulse) motor. As shown in FIG. 8, the pulse motor 9 is arranged to be driven at a high speed with a small current for a period of time longer than the backlash absorbing time in such a way as to be driven at a small torque. Further, in this instance, the third embodiment is set to satisfy a conditional relation "t1>t2", with a driving load on the optical system assumed to be t1 and the pull-out torque of the pulse motor 9 assumed to be t2.

The backlash is thus absorbed and the pulse motor 9 comes to step out at the very instant the optical system should begin to move. Then, a normal build-up process follows. At this time, in order that the reading action in the third embodiment is to be restarted from a suspended position, the phase of the rotor and that of the stator in the third embodiment must be the same as each other before and after the stepping-out moment. Then, since the pulse motor 9 can be allowed to rotate at a high speed without fail while the backlash is in process, the noise can be reliably lessened. The arrangement of the third embodiment obviates the necessity of exactly grasping the amount of backlash, because the third embodiment operates without being affected by unevenness of the amount of backlash between individual apparatuses and the position where the operation is suspended.

The invention is not limited to the arrangement of each of the embodiments described above. For example, the number of pulses to be used in feeding one line does not have to be four. With regard to the photo-scanning means, the relative speeds of the lamp unit and the mirror unit do not have to be in the ratio of 1:2. The photo-scanning means also may be formed by arranging the mirror, the lens and the image sensor into one unit.

Some actuator other than the stepping motor may be used for motor drive control. The plurality of means for transmitting the driving (rotating) force of the motor does not have to be the gear train but may be some other transmission means, such as means including a timing pulley, a timing belt, etc. Further, the invention is applicable also to apparatuses other than the image scanner. The invention also advantageously applies particularly to indoor business machines such as input and output devices for computers, including an XY plotter (particularly, a pen thereof), an ink-jet printer and some other printers.

As described above, in a motor control apparatus for driving and controlling a motor so as to transmit a rotating force of the motor through a plurality of transmission means, the motor control apparatus is provided with control means for, when reversing a rotation of the motor, causing the motor to rotate at a speed higher than a normal rotation speed only for a period of time which is substantially the same as a period of time required for absorbing a clearance existing between the plurality of transmission means. Accordingly, a noise which is caused in reversing the rotation of the motor by the existence of the clearance in the transmission part for transmitting a driving force of the motor can be minimized as much as possible.

What is claimed is:

1. A motor control apparatus for driving and controlling a motor so as to transmit a rotating force of the motor through a plurality of transmission means to an object, said motor control apparatus comprising:

control apparatus for, when reversing a rotation of the motor, causing the motor to rotate at a speed higher than a normal rotation speed with an electric power which does not exceed normal electric power only for a period of time which is substantially the same as the backlash absorbing time during which the object is not moved as yet in the initial stage of reversing the rotation of the motor.

2. A motor control apparatus according to claim 1, wherein said control apparatus causes the motor to rotate at the higher speed with a current which is smaller than a current to be supplied to the motor in rotating the motor at the normal rotating speed.

3. A motor control apparatus according to claim 1, further comprising measuring means for measuring said measurable clearance existing between the plurality of transmission means.

4. A motor control apparatus according to claim 1, wherein said control apparatus causes the motor to rotate at the higher speed for a period of time which is a little shorter than the period of time required for absorbing said measurable clearance existing between the plurality of transmission means.

5. A motor control apparatus according to claim 1, wherein the plurality of transmission means are composed of gears.

6. A motor control apparatus according to claim 1, wherein the motor is composed of a stepping motor.

7. A motor control apparatus according to claim 1, wherein the motor is arranged to drive a member which makes a reciprocating motion in an image reading apparatus.

8. A motor control apparatus according to claim 1, wherein the motor is arranged to drive a scanning optical system in an image reading apparatus.

9. A motor control apparatus according to claim 1, wherein the motor is arranged to drive a pen in an XY plotter.

10. A motor control method for driving and controlling a motor so as to transmit a rotating force of the motor through a plurality of transmission means to an object, said motor control method comprising:

a first control step of causing the motor to rotate one direction; and a second control step of, when reversing a rotation of the motor, causing the motor to rotate at a speed higher than a normal rotation speed with an electric power which does not exceed normal electric power only for a period of time which is substantially the same as the backlash absorbing time during which the object is not moved as yet in the initial stage of reversing the rotation of the motor.

11. A motor control method according to claim 10, wherein said second control step causes the motor to rotate at the higher speed with a current which is smaller than a current to be supplied to the motor in rotating the motor at the normal rotating speed.

12. A motor control method according to claim 10, further comprising a measuring step of measuring said measurable clearance existing between the plurality of transmission means.

13. A motor control method according to claim 10, wherein said second control step causes the motor to rotate at the higher speed for a period of time which is a little shorter than the period of time required for absorbing said measurable clearance existing between the plurality of transmission means.

14. A motor control method according to claim 10, wherein the plurality of transmission means are composed of gears.

15. A motor control method according to claim 10, wherein the motor is composed of a stepping motor.

16. A motor control method according to claim 10, wherein the motor is arranged to drive a member which makes a reciprocating motion in an image reading apparatus.

17. A motor control method according to claim 10, wherein the motor is arranged to drive a scanning optical system in an image reading apparatus.

18. A motor control method according to claim 10, wherein the motor is arranged to drive a pen in an XY plotter.

19. A storage medium which stores therein a motor control program for driving and controlling a motor so as to transmit a rotating force of the motor through a plurality of transmission means to an object, said control program comprising the control steps of:

a first control step of causing the motor to rotate one direction; and a second control step of, when reversing a rotation of the motor, causing the motor to rotate at a speed higher than a normal rotation speed with an electric power which does not exceed normal electric power only for a period of time which is substantially the same as the backlash absorbing time during which the object is not moved as yet in the initial stage of reversing the rotation of the motor.

20. A storage medium according to claim 19, wherein said second control step causes the motor to rotate at the higher speed with a current which is smaller than a current to be supplied to the motor in rotating the motor at the normal rotating speed.

21. A storage medium according to claim 19, wherein said control program further comprising a measuring step of measuring said measurable clearance existing between the plurality of transmission means.

22. A storage medium according to claim 19, wherein said second control step causes the motor to rotate at the higher speed for a period of time which is a little shorter than the period of time required for absorbing said measurable clearance existing between the plurality of transmission means.

23. An image reading apparatus for driving and controlling a motor so as to transmit a rotating force of the motor through a plurality of transmission means to a scanning optical system, said image reading apparatus comprising:

control means for, when reversing a rotation of the motor, causing the motor to rotate at a speed higher than a normal rotation speed with a current smaller than a normal current only for a period of time which is substantially the same as the backlash absorbing time during which the object is not moved as yet in the initial stage of reversing the rotation of the motor.

24. An image reading apparatus comprising:

a motor for transmitting a moving force to a movable object through a plurality of transmission elements having a backlash when reversing a movement of said object from a first direction to a second direction; and a control circuit for driving the motor to move at a first speed with a first current when moving said object in said first direction, and for driving said motor at a second speed faster than said first speed, with a second current less than said first current during a period before said object starts moving in said second direction after said object stops moving in said first direction.

* * * * *